Jan. 18, 1938.  E. G. BUSSE  2,105,995
BRAKE BEAM SAFETY GUARD STRUCTURE
Filed Aug. 1, 1935  3 Sheets-Sheet 1
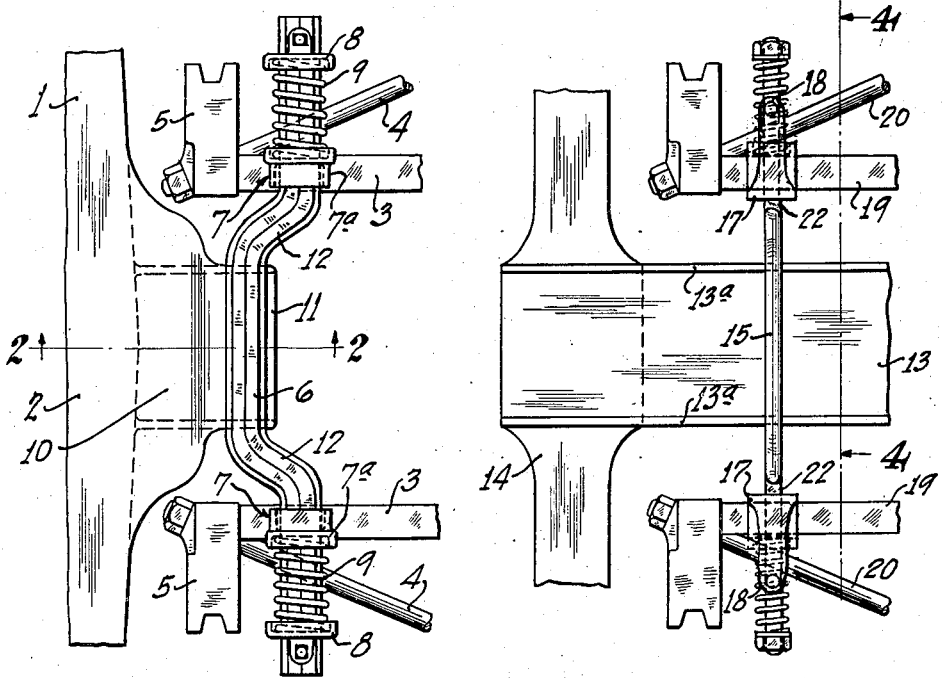
Fig. 1.
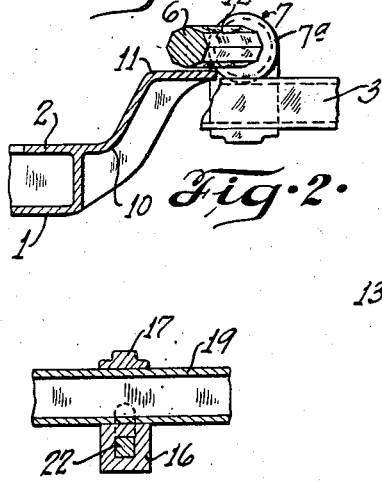
Fig. 2.
Fig. 3.
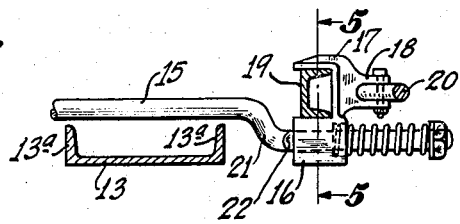
Fig. 4.
Fig. 5.
Inventor
Edwin G. Busse.
By Rodney Bedell
Attorney Jan. 18, 1938.  E. G. BUSSE  2,105,995
BRAKE BEAM SAFETY GUARD STRUCTURE
Filed Aug. 1, 1935   3 Sheets-Sheet 2
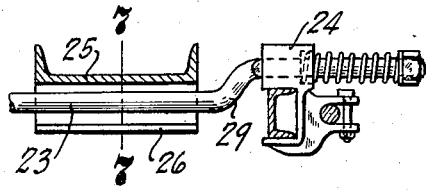
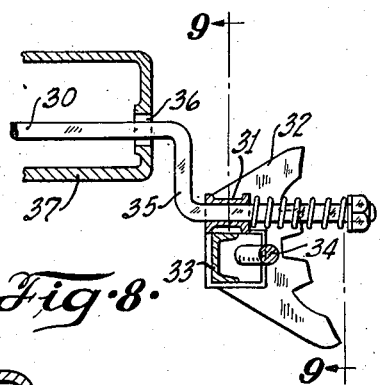
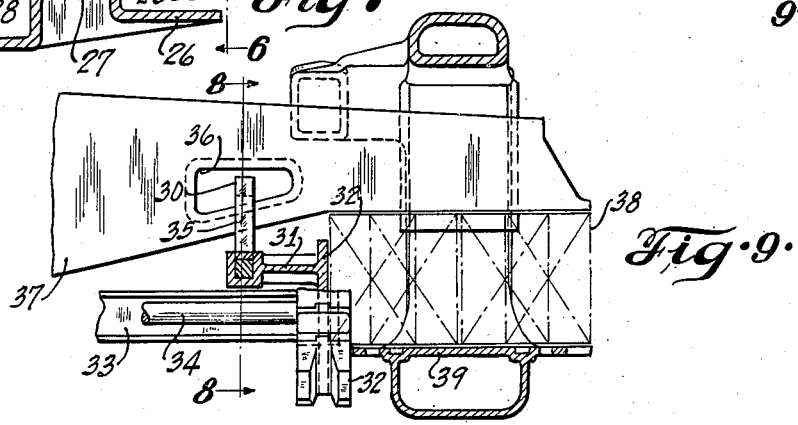
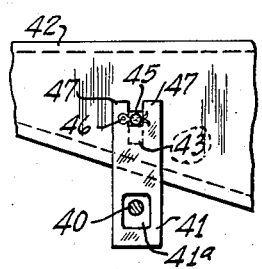
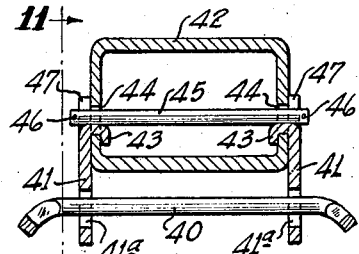
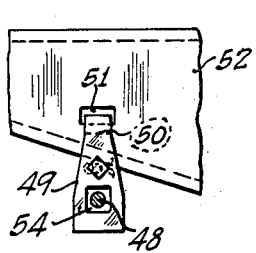
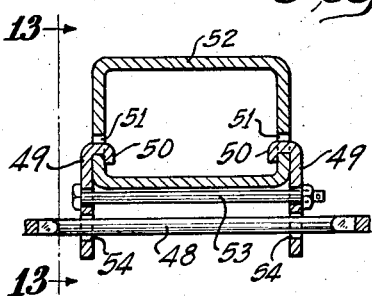
Inventor
Edwin G. Busse.
By Rodney Bedell
Attorney Jan. 18, 1938.  E. G. BUSSE  2,105,995
BRAKE BEAM SAFETY GUARD STRUCTURE
Filed Aug. 1, 1935  3 Sheets-Sheet 3
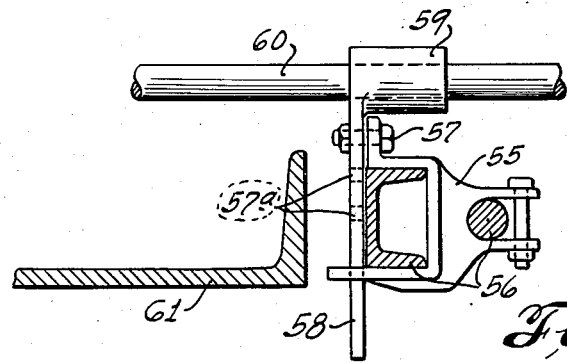
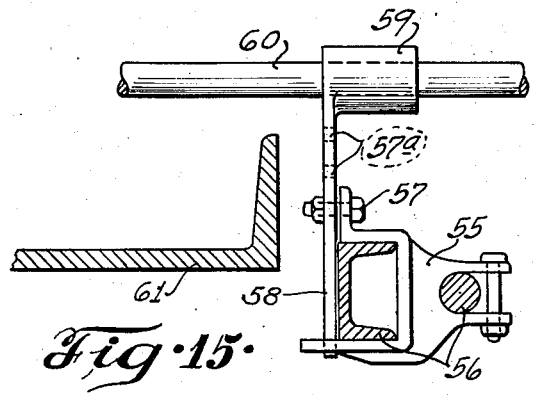
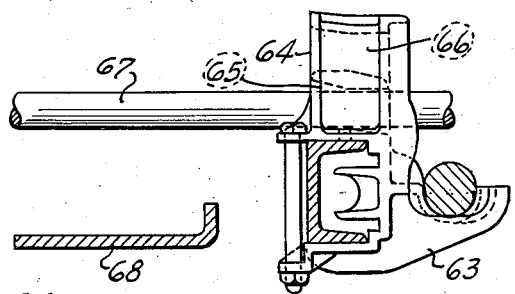
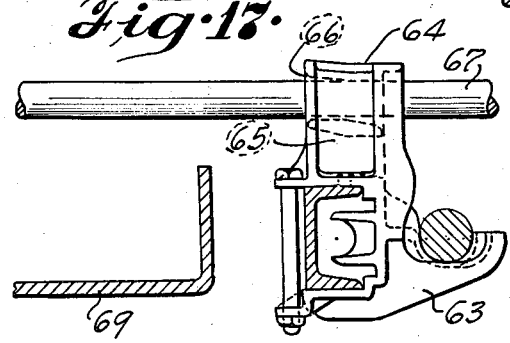
Inventor
Edwin G. Busse.

Patented Jan. 18, 1938

2,105,995

UNITED STATES PATENT OFFICE 2,105,995

BRAKE BEAM SAFETY GUARD STRUCTURE

Edwin G. Busse, Chicago, Ill., assignor to Chicago Railway Equipment Company, Chicago, Ill., a corporation of Illinois Application August 1, 1935, Serial No. 34,153

14 Claims. (Cl. 188—210)

This invention relates particularly to safety guards for railway brake beams.

A type of brake beam safety guard previously in use in railway trucks embodies a pair of rods secured to adjacent brake beams near the brake heads and extending between the beams and over the intervening spring plank. The rods are provided with springs which normally urge the beams away from the wheel treads and function as brake releases.

In case of injury to the brake hangers or hanger pins, these rods engage the spring plank and prevent the beams from falling to the track so as to incapacitate the brakes and endanger the train. Obviously, this type of safety guard cannot be used in a truck which has no spring plank. Also variations in the relative heights of the brake beams and the spring plank present difficulties. Where the spring plank extends above the level of the beams, as may be the case, this type of safety guard has not been used.

Brake beam safety guard arms, ledges, and brackets have been provided heretofore on truck side frames, but the special safety guard and release rods referred to above are ordinarily located too far above or too far inwardly from these projections to properly cooperate therewith for safeguarding the beams.

The main object of the present invention is to provide a safety guard of the general type described above which is adapted to cooperate with a truck part located in such a position that a guard rod and beam connection of this type, constructed as in the past, will not function properly therewith.

Another object of the invention is to provide a brake beam safety guard of the general type described above but which may be utilized in a spring-plankless truck.

Another object is to reconstruct a safety guard of the above type so as to cooperate with a relatively short bracket or ledge on the truck side frame.

Another object is to prevent rotation of the safety guard rod where this rod is provided with a vertical or horizontal offset for cooperating with a projection on the truck side frame.

Still another object is to arrange a safety guard rod of the above type so as to cooperate with a truck bolster.

These objects and others hereafter appearing are attained substantially by the structures illustrated in the accompanying drawings in which—

Figure 1 is a top view showing parts of a railway truck embodying the invention.

Figure 2 is a vertical transverse section taken on the line 2—2 of Figure 1.

Figure 3 is a view similar to Figure 1 but illustrating a modification.

Figure 4 is a detail vertical longitudinal section taken on the line 4—4 of Figure 3.

Figure 5 is a detail vertical transverse section taken on the line 5—5 of Figure 4.

Figure 6 is a vertical longitudinal section taken on the line 6—6 of Figure 7 illustrating another modification.

Figure 7 is a vertical transverse section taken on the line 7—7 of Figure 6.

Figure 8 is a vertical longitudinal section taken on the line 8—8 of Figure 9.

Figure 9 is a vertical transverse section taken on the line 9—9 of Figure 8.

Figures 10 and 12 are detail vertical longitudinal sections of truck bolsters and illustrating other modifications.

Figures 11 and 13 are detail side views showing the structure in Figures 10 and 12, respectively.

Figures 14 and 16 are vertical sections similar to Figures 4 and 6 and showing other forms of the invention.

Figures 15 and 17 are views of the structures in Figures 14 and 16, respectively, but showing the guard rods adjusted differently.

Certain features illustrated in the present application are more fully disclosed and claimed in a copending application Serial No. 34,129, filed August 1, 1935 in the name of Robert B. Cottrell.

Figures 1 and 2 show the lower part 1 of a railway truck side frame including horizontal bolster spring seating web 2. Extending transversely of the truck are the brake beam assemblies including compression members 3 and tension members 4 forming truss-type brake beams, and brake heads 5. Extending between the brake beams adjacent brake heads 5 are a pair of longitudinal members, one of which is shown at 6 secured to the brake beams by means of brackets 7. Compressed between collar portions 7a of brackets 7 and discs 8 secured to the ends of members 6 are coiled springs 9 which function as brake releases.

Extending inwardly from the lower member 1 of each side frame as a continuation of web 2 is a ledge 10 with its inner extremity 11 offset upwardly to a level immediately beneath the longitudinal member 6. Ledge 10 terminates short of a line between the portions of the brake beam assemblies to which member 6 is secured, and the intermediate portion of this member is offset outwardly, as at 12, so as to extend immediately above the upwardly offset portion 11 of bracket 10 for cooperating therewith to safeguard the brake beams.

In case member 6 is dropped upon bracket 10, the weight of the brake beam assemblies will tend to twist or rotate the member. To prevent this, the member 6, and particularly the portion thereof extending through collar 7a, is formed of non-circular section and is closely embraced by a similarly shaped opening in the collar.

In order to permit the use of the offset guard member 6 with a differently located side frame projection, or other truck part, the member may be rotated in the bracket collar 7a so as to vary the relative vertical and horizontal position of the intermediate portion of the member.

In Figures 3, 4, and 5, a spring plank 13 is provided extending between the lower parts of the side frames, one of which is indicated at 14. Longitudinal rod 15 extends beneath the beams and is secured thereto by means of brackets, each including a collar 16 and parts 17 and 18 embracing the compression and tension members 19 and 20, respectively. Rod 15 extends above spring plank 13 and is offset upwardly, as at 21, to clear the flanges 13a thereof. In order to prevent rotation of the offset intermediate portion of rod 15, the part thereof extending through collar 16 is squared, as shown at 22 in Figure 5. The rod 15 may be provided with a key, spline, or other similar element to secure the rod in collar 16.

The longitudinal safety guard rods may be offset upwardly, as shown where the spring plank is located substantially above the level of the beams, in a position to prevent the use of the ordinary straight rods, even though attached to the tops of the beams as in Figure 1. The offset rod 15 may also be used with other spring planks, or the clearance between the rod and underlying truck part may be varied, by rotating the rod in the collar 16 so that the offsets 21 extend horizontally, or downwardly, or at an angle.

In Figures 6 and 7, the longitudinal rod 23 is secured to the tops of the beams by means of brackets, as at 24, and extends between spring plank 25 and the downwardly offset inner portion 26 of ledge 27 forming a continuation of the side frame web 28 supporting the end of the spring plank. Rod 23 is offset downwardly, as at 29, and the portion thereof embraced by bracket 24 is preferably squared, as in Figure 5, to prevent rotation of the rod. The guard rod may be rotated in its beam attaching brackets, as in the previous form, to cooperate with a differently located truck part.

In Figures 8 and 9, the rod 30 is of rectangular section throughout and is secured to the brake beam assemblies by means of brackets 31 formed integral with the brake heads 32. The rod is not directly secured to the beam compression and tension members 33 and 34 as in the previous forms.

The intermediate portion of rod 30 is offset upwardly, as at 35, and extends through openings 36 in the side walls of box-shaped bolster 37, it being understood that similar openings 36 are provided on each side of the bolster. Sufficient space is provided between rod 30 and the adjacent upwardly and downwardly facing surfaces of openings 36 to permit normal relative vertical movement of the bolster and brake beams due to compression and expansion of the bolster supporting springs diagrammatically indicated at 38 and resting upon bolster spring seating web 39. The rod 30 may be rotated, as in the previous forms.

In Figure 10, a longitudinal rod 40, corresponding to rod 30 in Figures 8 and 9, extends through recesses 41a in brackets 41 secured to and depending beneath bolster 42. In this form, the intermediate portion of rod 40 is offset upwardly in order to cooperate with brackets 41, and the rod may be rotated to vary the position of the offset portion thereof.

Each bracket 41 includes in its upper portion a lip or tongue 43 which is insertable in recess 44 in the side of the bolster to support the bracket, and withdrawal of these lips is prevented by a bar 45 extending across the bolster and through openings 44 and secured in place by keys 46 which overlap fingers 47 at the sides of tongues 43.

In Figures 12 and 13, rod 48, corresponding to rods 30 and 40, is safeguarded by means of brackets 49 having tongues 50 inserted in openings 51 in the side walls of bolster 52. Brackets 49 are secured in position by means of a bolt 53 extending through and between the same beneath the bolster. Rod 48 passes through apertures 54 in brackets 49.

Figures 14 and 15 show a bracket 55 secured to a brake beam 56 and adjustably secured by bolt 57 to an arm 58 projecting from the collar 59 which embraces guard rod 60. Arm 58 is shown in its lowest position so as to pass the proper distance above the flanges of spring plank 61. Extra bolt holes 57a are provided in arm 58 for adjustment thereof.

Figure 15 shows the bracket arm 58 in its highest position so that the guard rod will pass the proper distance above spring plank 61 located higher than the spring plank 61 in Figure 14.

Figures 16 and 17 show a different type of adjustable beam connection having a portion 63 secured to the beam compression and tension members and an upstanding part 64 having a pair of openings 65 and 66 for selectively receiving the guard rod 67. Figure 16 shows the rod 67 in the lower opening 65 so as to pass the proper distance above the low flange spring plank 68.

Figure 17 shows the guard rod extending through the higher bracket hole 66 so as to cooperate properly with a high flange spring plank 69.

In all of the forms, the brake beam assemblies are effectively safeguarded in cases where ordinary guards of the same general type cannot be used and without affecting the normal operation of the beams. Unintentional rotation of the offset safety guard rods or bars is prevented. The inwardly extending ledges or brackets on the side frames are substantially shorter and therefore less subject to danger due to vibration and striking of objects between the rails than would be the case if straight rods were used as heretofore, necessitating a longer safeguarding bracket. Application of the invention permits the use of the particular type of safety guard even though a spring plank or other truck element is in such position as to interfere with a straight rod extending between the brake beams. In several of the forms, the same safety guard equipment can be used with widely varying cooperating truck parts.

The invention is not limited to the details illustrated but may be modified in various respects as will occur to those skilled in the art, and the exclusive use of all such modifications coming within the scope of the appended claims is contemplated.

What is claimed is:

1. In combination, a railway truck side frame member, including a spring seat and a bracket extending upwardly and inwardly therefrom, spaced brake beams, and an elongated member having portions secured to said brake beams and having another portion offset laterally of the truck from said first-mentioned portions and extending immediately above said bracket and cooperating therewith to safeguard said assembly.

2. In a railway truck, a brake beam assembly, a truck part provided with an upwardly facing element, and an elongated member having a portion secured directly to said beam assembly and having another portion offset transversely of the axis of said first-mentioned portion and extending directly above said element for safeguarding said assembly against dropping to the rail, said brake beam assembly being provided with a non-circular device and said elongated member having a non-circular part secured in said beam assembly device so as to prevent rotation of said member and maintain said offset portion properly positioned relative to said element.

3. In a railway truck, side structure, a lateral projection on said structure terminating a short distance inwardly thereof, a brake beam assembly, and an elongated member secured to a part of said beam assembly spaced inwardly of said side structure a greater distance than the inner extremity of said projection, said member extending longitudinally of the truck from said assembly and then being offset outwardly and extending immediately above said projection for cooperating therewith to safeguard said assembly.

4. In a railway truck, side structure, a brake beam assembly, an elongated member secured to said assembly and extending longitudinally of the truck therefrom, and a projection on a part of said side structure located substantially beneath the level of said elongated member and extending upwardly to a level immediately beneath said member, the portion of said member secured to said beam assembly being located substantially inwardly of the extremity of said projection and said member being offset outwardly and extending directly over said projection for safeguarding said assembly.

5. In a railway truck, a spring plank, a brake beam assembly, and an elongated member secured to said assembly and extending longitudinally of the truck therefrom, said member having a portion offset vertically from the part thereof secured to said assembly and extending immediately above said spring plank for safeguarding said assembly, there being means for holding said member on said assembly with said offset portion in position as described.

6. In a railway truck, side structures, a spring plank extending therebetween, brake beam assemblies including transverse beams and heads, and an elongated member secured directly to said assemblies and connecting the same, the portions of said elongated member secured to said assemblies being located substantially at the level of a part of said spring plank and the intermediate portion of said member being offset upwardly and extending immediately above said spring plank for safeguarding said assemblies, there being means for holding said member on said assembly with said offset portion in position as described.

7. In a railway truck, a transverse wall having a recess, a brake beam assembly at the side of said wall, an elongated member secured to and extending longitudinally of the truck from said asembly, a bracket element extending beneath said member for safeguarding said assembly and with a lip insertable in said wall recess to support the element, and removable structure for preventing withdrawal of said lip from said recess.

8. The combination of elements specified in claim 7 in which the part of said elongated member cooperating with said bracket is vertically offset from the portion thereof secured to said assembly.

9. Means applicable to a railway truck bolster for safeguarding a railway brake beam assembly from dropping on the track comprising an elongated member for attachment to the assembly, a bracket for underlying said member and having a lip insertable in a recess in a wall of the bolster to support the bracket in position to underlie said elongated member, and means for detachably resisting withdrawal of said lip from said recess.

10. In combination, a brake beam assembly, a truck part, an elongated member extending directly above said truck part for safeguarding said assembly, and means securing said elongated member to said beam assembly, said means being adapted to vary the relation of said member to said assembly or truck part.

11. Structure as specified in claim 10 in which said elongated member is adjustable to a plurality of vertical positions relative to said beam assembly.

12. Structure as specified in claim 10 in which said elongated member has an offset portion spaced from said beam assembly, said member being rotatable to permit adjustment of said offset portion vertically and horizontally relative to said assembly.

13. In combination, a pair of spaced brake beam assemblies, an elongated member extending between said assemblies, and means securing said member to said assemblies, said member and means being constructed and arranged whereby the intermediate portion of said member may be secured in different positions relative to said beam assemblies to engage a truck part for safeguarding said assemblies.

14. In combination, a brake beam assembly, an elongated member extending transversely of the beam assembly, and means securing said member to said assembly, said member and means being constructed and arranged whereby the portion of said member spaced from said assembly may be secured in different positions relative to said assembly to engage a truck part for safeguarding said assembly.

EDWIN G. BUSSE.